June 27, 1961 V. H. PAVLECKA 2,990,104
SUPERCHARGER USING CENTRIPETAL FLOW COMPRESSOR
AND CENTRIFUGAL FLOW TURBINE
Filed Oct. 15, 1958 4 Sheets-Sheet 1

INVENTOR.
VLADIMIR H. PAVLECKA
BY
Nicholas T. Volk
his ATTORNEY.

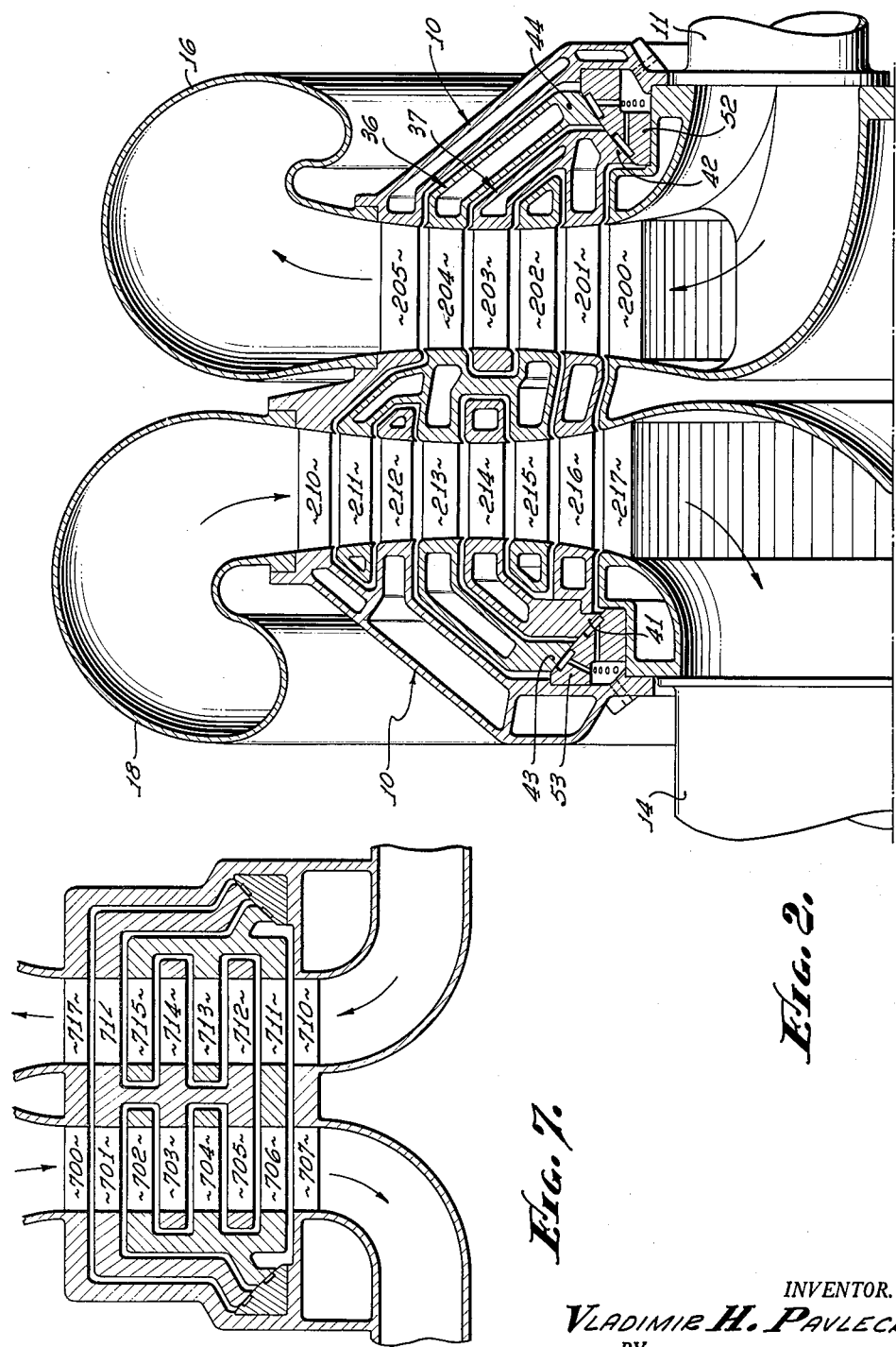

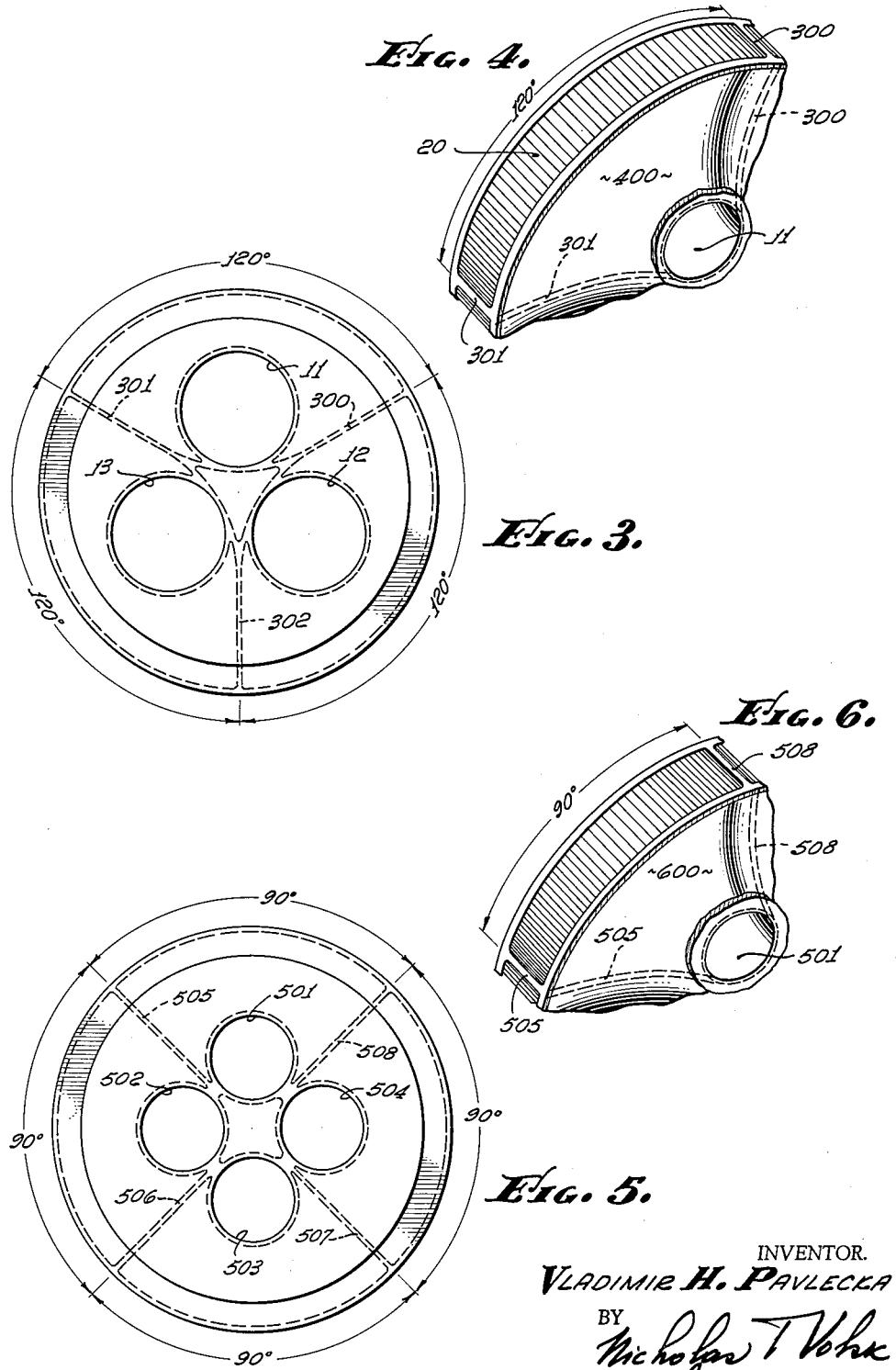

June 27, 1961  V. H. PAVLECKA  2,990,104
SUPERCHARGER USING CENTRIPETAL FLOW COMPRESSOR
AND CENTRIFUGAL FLOW TURBINE
Filed Oct. 15, 1958  4 Sheets-Sheet 4

INVENTOR.
VLADIMIR H. PAVLECKA
BY
Nicholas T. Vohs
HIS ATTORNEY.

United States Patent Office 2,990,104
Patented June 27, 1961

2,990,104
SUPERCHARGER USING CENTRIPETAL FLOW COMPRESSOR AND CENTRIFUGAL FLOW TURBINE

Vladimir H. Pavlecka, 1176 Monument St., Pacific Palisades, Calif.
Filed Oct. 15, 1958, Ser. No. 767,440
6 Claims. (Cl. 230—116)

This invention relates to superchargers utilizing a centrifugal flow turbine for driving a centripetal flow compressor for compressing ambient air to a desired pressure for supercharging internal combustion engines.

It is the object of this invention to provide a supercharger utilizing a multi-stage centripetal flow compressor and a multi-stage centrifugal flow turbine, the compression stages being directly connected to the turbine stages.

It is an additional object of this invention to provide a supercharger of the above type in which the compressor and the turbine stages are integrated into unitary rotors mounted on air bearings so that the entire supercharger structure does not have any central shaft or shafts for supporting the multi-rotor structure of the supercharger.

It is an additional object of this invention to provide a supercharger of the above type which includes a plurality of contra-rotatable rotors, a plurality of contra-rotatable stages in the centripetal compressor, a plurality of contra-rotatable stages in the centrifugal flow turbine with the compressor provided with input and output stators and the turbine also provided with the input and output stators with the input ducts being connected to the turbine input stator so that the ducts and the corresponding stator sectors are isolated from each other fluid-dynamically.

Superchargers of the above type are used widely in connection with internal combustion engines either of four or two cycle type. The four cycle engines are the conventional gasoline engines that are used for transportation purposes and also in aircraft, while the two cycle engines are the diesel engines which are widely used wherever their high specific weight is not objectionable. Superchargers which are now in use range from miniature superchargers six inches in diameter to nine feet outside diameter. The small diameter and small capacity superchargers are used primarily with the small diesel and gasoline engines, while the large diameter superchargers are used with large diesels. A single diesel engine requires as many as three or four superchargers, which is especially the case in connection with the marine diesel engines having high horsepower capacity. The known superechargers use either a centrifugal flow single stage compressor connected to an axial flow turbine or a centrifugal flow compressor connected to a centrifugal flow turbine having the same type of rotor as the compressor. The compression ratio of such superchargers is not especially high, their thermodynamic efficiencies are low, and they also have a rather high specific weight and volume and, therefore, must have separate mountings whenever the walls of the supercharged engine are not sufficiently strong to support such superchargers. The known superchargers, especially whenever they have high specific output, have complex lubricating systems which increase the cost of such superchargers. In general, however, the superchargers of the present day perform well and have gained a wide acceptance throughout many uses and applications on prime movers of the above type.

The invention discloses a supercharger for the above uses which has a much higher thermodynamic efficiency, a smaller specific volume, smaller specific weight, higher specific output and compression ratio per unit horsepower, and which can be produced at a lower cost because of the simpler geometry of the supercharger, and which does not require the use of any elaborate lubricating system.

Referring to the drawings:

FIGS. 1 and 2 are axial sectional views of the supercharger;

FIGS. 3 and 5 are transverse sectional views of the input ducts taken along line 3—3 illustrated in FIG. 1;

FIGS. 4 and 6 are perspective views of one sector of the turbine input duct and stator;

FIG. 7 is an axial sectional view of a supercharger having six compression and six turbine stages and no vector-adjusting stage;

Figure 1:
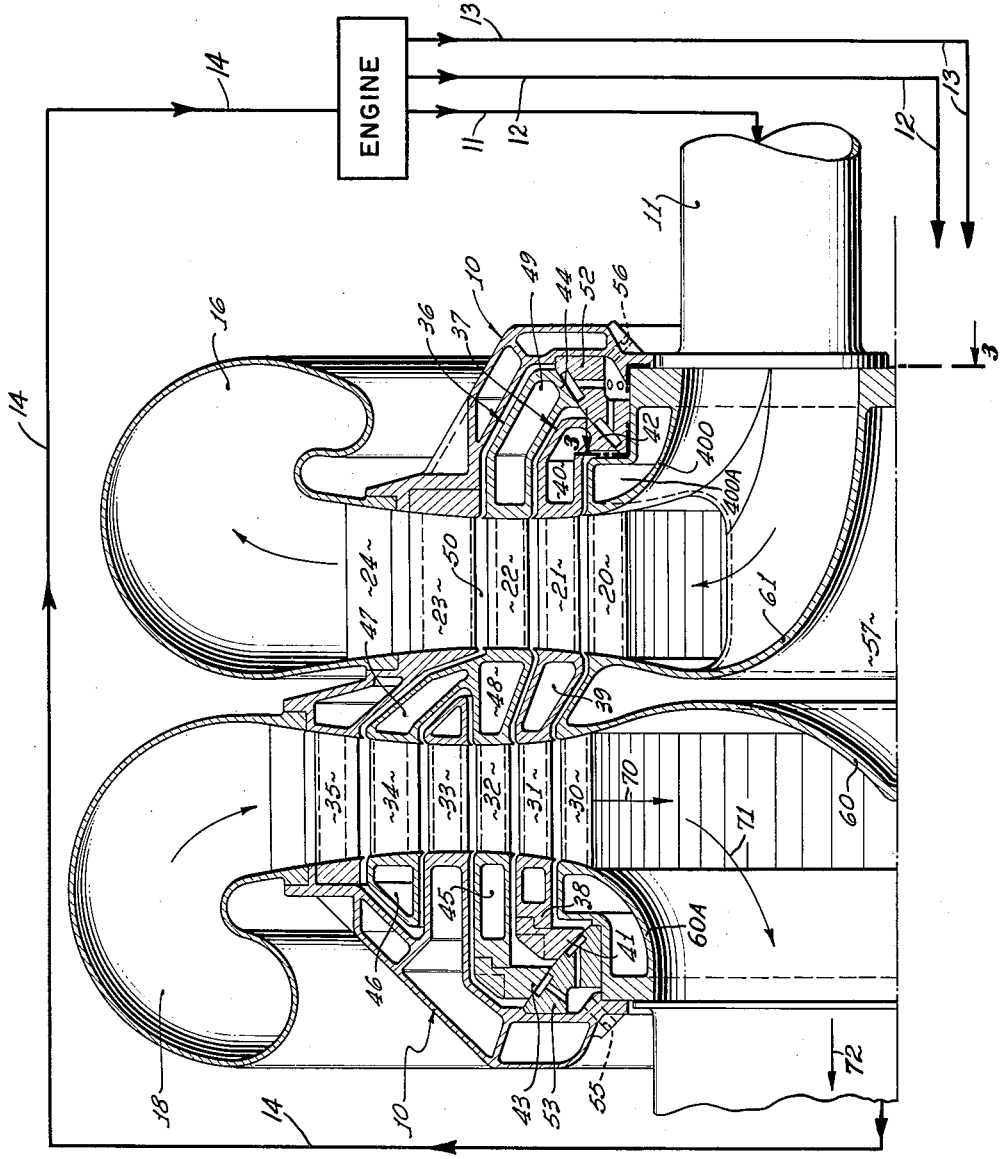

Referring to FIG. 1, the supercharger comprises a frame 10 composed of a plurality of hollow frame members. This frame is used for supporting a plurality of isolated input ducts 11, 12 and 13 (see FIG. 3), and a compressed air output duct 14. The input ducts 11 through 13 are connected to the exhaust manifolds of the engine which supply hot exhaust gases to the turbine of the supercharger. The stationary portion of the supercharger also includes an exhaust hood 16, an intake hood 18, turbine stators 20, 23 and 24, and compressor stators 30, 33 and 35. The supercharger illustrated in FIG. 1 has two rotors, an outer rotor 36 and an inner rotor 37. Rotor 37 includes a turbine stage 21, a compressor stage 31, hoop rings 38, 39 and 40, and air bearing rotors 41 and 42.

The outer rotor 36 includes rotatable compression stages 32 and 34, a rotatable turbine stage 22, air bearing rotors 43 and 44, and hollow rings 45 through 49. The compression stages 32 and 34 are separated by a stationary vector adjusting stage 33, which enables one to obtain a substantially constant Mach number operation through all the stages of the compressor. For a more detailed description of the function performed by the vector adjusting stage reference is made to the co-pending application Serial Number 514,001, filed on June 8, 1955, titled "Methods of Compressing Fluids with Centripetal Compressors," now abandoned and replaced with the continuation application Serial Number 12,479, filed March 2, 1960, having the same title as the parent application, where the functioning of such stages is described in greater detail.

The same application also describes the advantages obtained when a centrifugal flow turbine is provided with a stator stage, such as stage 20. Stator 20 is an expansion stator, which imparts to the gases reaching the turbine a high velocity and such pre-acceleration of the working fluid enables one to convert the potential and the kinetic energies of the working fluid in a lesser number of turbine stages. Turbine stator 23 is a diffusion stator, which reduces the velocity of the fluid leaving the last turbine stage 22 and entering hood 16, and it also creates a low pressure in a gap 50 between stage 22 and the diffusion stator 23. Accordingly, the last stage 22 is capable to produce more work, because of the expansion of gases into a lower pressure than the pressure which would have existed on the exhaust side of the turbine stage 22 if stator 23 were not present. As mentioned above, the functioning of the stator 23 is described more in detail in the application Serial Number 514,001, now abandoned and Serial Number 12,479 and therefore, it needs no additional description here.

The above application also includes the transverse sectional views of the turbine and compressor blading, and the description of such blading. Accordingly, there is no need to describe it here.

The rotors 41 through 44 of the air bearings are supported by stators 52 and 53, which in turn are supported by frame 10. The air bearings illustrated in this figure are aerostatic bearings described more in detail in the co-pending application for patent Serial Number 759,-626, filed on September 8, 1958, titled "Aerostatic Bearings with Fluid-Dynamic Seals," now Patent No. 2,916,-332 issued December 8, 1959, which is made a part of this description for the purpose of completing the decription of the bearings. The bearings are connected through ducts 55 and 56 to a source of compressed air. This source may be the compressor itself, and the compressed air appearing in duct 14, if the compression ratio of the compressor is sufficiently high for properly supporting the rotors 36 and 37 of the supercharger. If such compression ratio is not sufficiently high, then ducts 55 and 56 are connected to some external source of compressed air, which has sufficiently high pressure for proper operation of the air bearings.

In order to insulate the air duct 14 from the hot gases ducts 11 through 13, the supercharger is provided with a central cavity 57, which may be filled with water and this water may be circulated, in the same manner as it is circulated in the internal combustion engines for cooling walls 60 and 61 of the ducts. Wall 400 can also be made either an air or water cooled wall and in the event wall 400 is water cooled, then the water contained in reservoir 57 can be circulated from reservoir 57 into reservoir 400–A for cooling not only the walls 60, 61 and 400, but also for water-cooling the input acceleration stator 20 of the turbine.

It is to be understood, that the turbine, as well as the compressor stages will be provided with gas seals for preventing leakage of compressed air, and hot gases from the compressor to the turbine and vice versa, and also for preventing the interstage leakage. Such gas seals, as a rule, assume the form of labyrinth seals. The seals are not illustrated in the drawings for simplifying them, and also because of the fact that seals of this type are known in the art, and therefore need no description, nor illustration, in this application.

Before proceeding with the more detailed description of the input ducts of the supercharger, it should be mentioned here that stator 30 of the compressor, as mentioned previously, is not only a diffusion stator but also a flow-directing stator, with the result that fluid discharges in the centripetal direction illustrated by arrow 70. Surfaces 60 and 60–A then turn the compressed fluid in the direction indicated by arrow 71, whereupon the compressed fluid reaches the compressor inan axial direction indicated by arrow 72. Surface 60–A is an acceleration surface and it should have sufficiently large radius so as to avoid turbulences and separation along the surface. The same is true of surface 60.

Referring now more in detail to FIGS. 3 and 4, they illustrate the transverse sectional view, and the perspective view, respectively, of the input ducts 11 through 13. Since the perspective view is more readily understandable than the transverse section of FIG. 3, it is best to describe FIG. 4 first. It illustrates one of the incoming ducts, such as duct 11, and the curved portion 400 of the input duct, which terminates in stator 20. In FIGS. 3 and 4, it is presumed that the supercharger is connected to a six cylinder engine and, therefore, it is possible to operate the turbine by providing only three separate ducts 11 through 13 for operating the turbine, and for conveying exhaust gases from the six cylinders of the engine to the turbine. Such ducting of the exhaust portion of the engines is known in the art, and does not require a detailed description. Suffice it to say, that the number of separate ducts that is necessary to have on the input side of the turbine is determined by the number of the cylinders used in the engine. This number of cylinders also determines the opening and closing, and especially timing, of the intake and exhaust valves in the engine, and this sequence of the valve operation determines which of the engine cylinders can be connected to the turbine at the same time without shunting them through the turbine, when such cylinders have their intake and compression strokes. As mentioned previously, three separate ducts, such as ducts 11 through 13 are required in connection with the six cylinder engine, and four ducts 501 through 504, FIG. 5, are necessary when the engine is an eight cylinder engine. Therefore, the number of the required ducts is equal to the number of cylinders divided by two. These ducts are fluid-dynamically isolated from each other. It is this portion, and this portion only, of the ducting that is known to the prior art.

Since the centrifugal flow turbine is provided with stator 20, it follows that the input ducts 11, 12 and 13 convey exhaust gases to the three separate sectors of the stator, which must be fluid-dynamically disconnected from each other in the same manner as the input ducts 11, 12, and 13. This is accomplished by providing three radially positioned walls 300, 301, and 302, which divide the input stator 20 into three 120° sectors of the type illustrated in FIG. 4. They enable one to convey the exhaust gases to the turbine stator 20 without creating any cross flow of gases from one sector to the adjoining sector. Accordingly, in addition to its first function of acting as an accelerating device for the exhaust gases, stator 20 also acts as a one-way flow device with respect to the three input ducts 11 through 13 and the engine. The same is also true of what is illustrated in FIGS. 5 and 6, except that in these figures there are four input ducts 501 through 504, and therefore, the fluid dynamically isolated sectors in stator 20 are 90° sectors, and there are four walls 505 through 508 for fluid dynamically isolating the respective sectors from each other. FIG. 6 is identical in every respect to FIG. 4, except that while in FIG. 4 the stator sector is 120°, in FIG. 6 sector 600 is only 90°.

Referring now to FIG. 2, it illustrates a supercharger which differs from the supercharger illustrated in FIG. 1 only in one respect, namely that the number of the compressor stages, and the number of the turbine stages has been increased in FIG. 2. In FIG. 1 there are two rotatable turbine stages 21 and 22 and three rotatable compression stages 31, 32 and 34. In FIG. 2 the turbine has four rotatable centrifugal flow turbine stages 201 through 204, which are positioned between the two stators 200 and 205, which correspond to the stators 20 and 23 in FIG. 1. There are five rotatable compression stages 211 and 213 through 216, two stators 217 and 210, corresponding, respectively, to the stators 30 and 35 in FIG. 1, and a stationary vector stage 212, which corresponds to stage 33 in FIG. 1. In all other respects the supercharger in FIG. 2 is similar to the supercharger in FIG. 1 and, therefore, does not need any additional description. The remaining corresponding elements in FIGS. 1 and 2 have the same numerals.

As stated in the previously mentioned co-pending application Serial Number 514,001, the vector adjusting stages are desirable in the subsonic compressors having a Mach number of the order of .85 to .99. However, it is feasible to have supersonic staging at Mach number 1.15, or higher, which does not require the use of the vector adjusting stages. Accordingly, in the supersonic compressors with Mach number of 1.15 or higher, it is possible to eliminate the vector adjusting stages altogether. It is possible to eliminate the vector adjusting stages in the subsonic compressors, as described in the application Serial No. 514,001, abandoned and replaced with continuation application Serial No. 12,479.

This type of compressor is illustrated in FIG. 7 in which the centripetal flow compressor stages are stages 700 through 707, and the centrifugal flow turbine stages are stages 710 through 717. There will be hardly any occasion in which the supercharger will require as many as six rotatable compression stages and six rotatable turbine stages, since the energy available in the exhaust gases is not sufficiently high for operating a supercharger with as many stages as that illustrated in FIG. 7. However, superchargers of this type can also be used in connection with the auxiliary combustion chambers interposed between the exhaust of the engine and the input of the turbine. These chambers are used for increasing the weight flow of gases into the turbine, and also for fully oxidizing the products of combustion leaving the engine. In such system the supercharger can also be used as an auxiliary prime mover, and in such case the number of the turbine stages, and of the compression stages may be increased to the number illustrated in FIG. 7.

Figure 8:
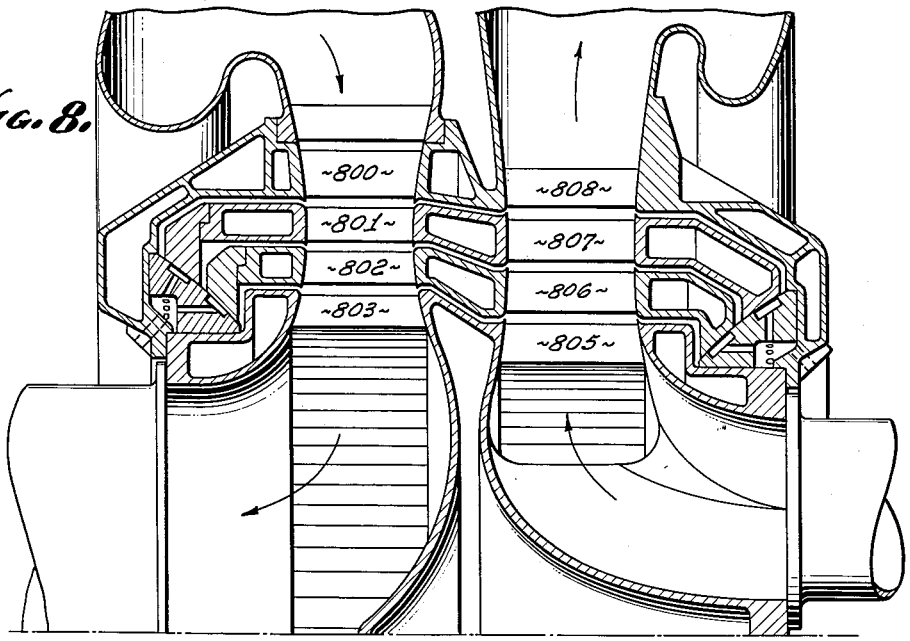
FIGS. 8 and 9 are schematic views of superchargers with two and four compression stages and two turbine stages, respectively.
Figure 9:
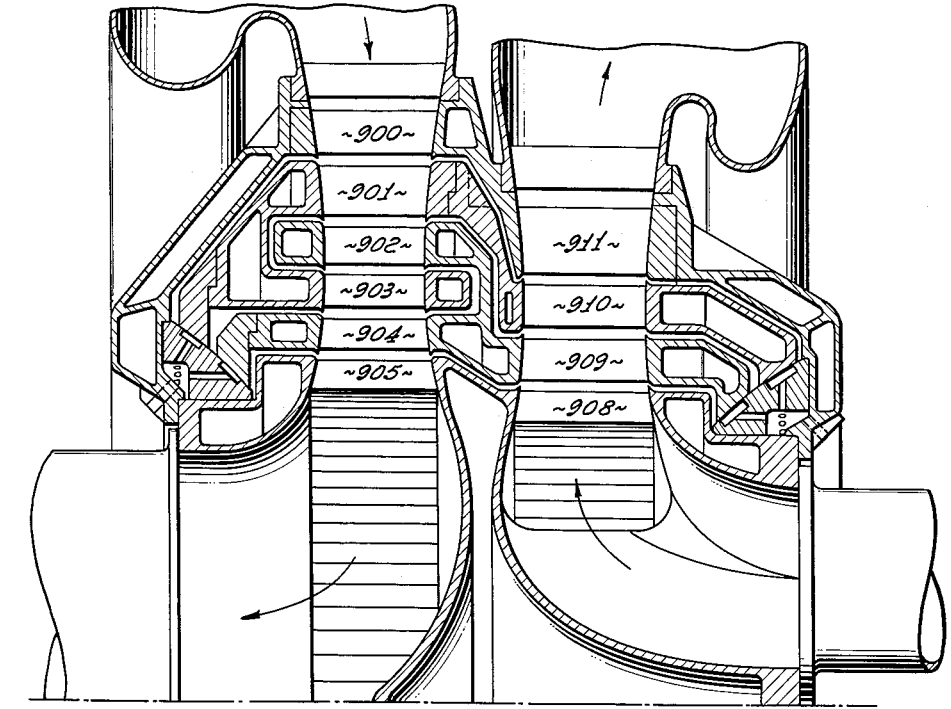

Examination of FIG. 7 also illustrates that insofar as the number of the compressor and turbine stages is concerned, it can be very readily decreased by merely taking off the innermost stages on the two rotors. This is illustrated in FIGS. 8 and 9. In FIG. 8 there are two rotatable compression stages 801 and 802 between the input and output stators 800 and 803, and two turbine stages 806 and 807 between two stators 805 and 808. In FIG. 9 there are four rotatable compression stages 901 through 904 between two stators 900 and 905 and two turbine stages 909 and 910 between two stators 908 and 911. FIGS. 7 through 9 have no vector adjusting stage because such is not needed when the compressor is either a supersonic compressor with Mach number of the order of 1.15 or higher, and the turbine is also a supersonic turbine with Mach number of the order of 1.3 or higher at the exit from stator 908, or the compressor and the turbines are subsonic but are designed to operate on the basis of an asymmetric vector diagram, as described in application Serial No. 514,001, now abandoned and Serial No. 12,479. Superchargers with a larger number of stages than two turbine stages and two compressor stages may be suitable for liquification of gases in the chemical industry, oil industry, and also, anywhere where the same gas is being expanded and compressed at the same time.

The compression ratio of the compressor can be improved and constant Mach operation of the compressor obtained even in the case where the compressor has a larger number of compression stages than two by operating the outer compression stage of the first rotor (stage 901 in FIG. 9) and the outer stage of the second rotor (stage 902) at equal peripheral velocities. This is accomplished by proportioning the turbine and the compressor stages so that the loading of the stages and the power delivered by the turbine stages is such as to produce the above arithmetic equality in the outer peripheral velocities of the two rotors. This is described more in detail in Application Serial No. 514,001, now abandoned and Serial No. 12,479.

FIGS. 3 through 6 illustrate three and and four input ducts connected to the turbine input stator. It is obvious that the minimum number of ducts is one for a one cylinder engine, and, from one, the number of ducts can be increased with the increase of the number of cylinders in the engine. The number of the required ducts is known in the art and requires no additional discussion.

What is claimed as new is:

1. A supercharger comprising a multistage centripetal flow compressor including an input stator an an output stator, said input stator being an acceleration-and-flow-directing stator, and said output stator being a diffusion-and-flow-directing stator; a multistage centrifugal flow turbine, including an input stator and an output stator; the stages of the compressor and turbine composing two contra-rotatable rotors; a frame surrounding and supporting said rotors; said frame including a plurality of individual, fluid-dynamically isolated turbine input ducts; said turbine ducts terminating in and being fluid-dynamically connected to said turbine input stator, said turbine input stator being an expansion stator fluid-dynamically divided into as many input sectors as there are turbine input ducts, and said turbine output stator being a diffusion stator fluid-dynamically connected to the last rotatable stage of the turbine.

2. A supercharger comprising a frame, a multi-stage centrifugal flow turbine, including an input expansion stator, an output diffusion stator and at least first and second rotatable, centrifugal flow turbine stages; a multistage centripetal flow compressor including an input stator and an output stator, said input stator being an acceleration-and-flow-directing stator, and said output stator being a diffusion-and-flow-directing stator; first, second and third rotatable centripetal flow compression stages, and a stationary vector-adjusting stage connected to the frame, said vector-adjusting stage being positioned between the first and second compression stages, said first and second compression stages being two co-rotating stages connected to the second stage of the turbine, and said third compression stage being a contra-rotatable compression stage connected to the first stage of said turbine; the stages of the compressor and turbine composing two contra-rotatable rotors, said frame surrounding and supporting said rotors; said frame including a plurality of individual, fluid-dynamically isolated turbine input ducts; said turbine ducts terminating in and being fluid-dynamically connected to said turbine input stator, said turbine input stator being fluid-dynamically divided into as many input sectors as there are turbine input ducts.

3. A supercharger comprising a multistage centripetal flow compressor including an input stator and an output stator, said input stator being an acceleration-and-flow-directing stator, and said output stator being a diffusion-and-flow-directing stator; a multistage centrifugal flow turbine, including an input stator and an output stator; the stages of the compressor and turbine composing two contra-rotatable rotors; air bearings for supporting said rotors; a frame surrounding and supporting said rotors; said frame including a plurality of individual, fluid-dynamically isolated turbine input ducts; said turbine ducts terminating in and being fluid-dynamically connected to said turbine input stator, said turbine input stator being an expansion stator fluid-dynamically divided into as many input sectors as there are turbine input ducts, and said turbine output stator being a diffusion stator fluid-dynamically connected to the last rotatable stage of the turbine.

4. A supercharger for an internal combustion engine, said supercharger comprising first and second contra-rotatable rotors; said rotors including rotatable stages of a centrifugal flow turbine and centripetal flow compressor; said turbine also including an input expansion stator, at least first and second turbine stages and an output diffusion stator; and said compressor including input and output stators and at least first, second, third and fourth compression stages; said first and third compression stages and said second turbine stage constituting said first rotor; and said second and fourth compression stage and said first turbine stage constituting the second, or the inner, rotor of said supercharger; said first rotor surrounding said second rotor; and a plurality of turbine input ducts terminating in and extending into said turbine input stator, with each duct having an input sector on said turbine input stator; said sectors spanning equal angles along the circumference of said turbine input stator, and each sector being fluid-dynamically isolated from the adjacent sectors.

5. The supercharger as defined in claim 4 in which the loading of the turbine and compressor stages of the two rotors is proportioned to produce equal, but opposite in direction, peripheral velocities of the first and second compression stages, first and second sets of air bearings for supporting said first and second rotors, respectively; each set including two air bearings, said rotors being mechanically disconnected from each other for free rotation of the first rotor in one direction and of the second rotor in the opposite direction at two unequal angular velocities and said equal peripheral velocities.

6. A supercharger for supercharging an internal combustion engine, said supercharger comprising first and second concentric contra-rotatable rotors, each rotor including at least one centrifugal flow turbine stage and at least one centripetal flow compression stage, a common axis of rotation for said first and second rotors, a stationary frame for supporting and surrounding said rotors, a centrifugal flow turbine input expansion stator having a plurality of walled-off fluid-dynamically isolated input sectors, each sector having a plurality of blades and its own input duct for sequentially conveying hot, partially expended exhaust gases from said engine to the respective sectors of said stator, each of said input ducts having an axial flow portion, a radial flow portion and a curved portion interconnecting said axial and radial portions, said radial portions being connected to and terminating in said turbine stator, said turbine stator being surrounded by and discharging into the first turbine stage, a second turbine stator surrounding the last rotatable turbine stage, said second turbine stator being a diffusion stator; input and output compressor stators, said compressor stators being primarily flow-directing stators, and a compressed air output duct connected to the compressor output stator, said last duct having a radial centripetal flow portion merging into an axial flow portion for conveying compressed air to said engine.

References Cited in the file of this patent

UNITED STATES PATENTS

| | | |
|---|---|---|
| 2,391,779 | Griffith | Dec. 25, 1945 |
| 2,804,747 | Pavlecka | Sept. 3, 1957 |
| 2,864,552 | Anderson | Dec. 16, 1958 |